United States Patent Office 3,770,806
Patented Nov. 6, 1973

3,770,806
NITRO-SUBSTITUTED PROPYL ESTER
Albert L. Rocklin, Walnut Creek, Calif., assignor to Shell Oil Company, New York, N.Y.
No Drawing. Filed Oct. 12, 1970, Ser. No. 81,636
Int. Cl. C07c $101/10$
U.S. Cl. 260—482 R          1 Claim

ABSTRACT OF THE DISCLOSURE

The novel 2,2-dinitropropyl $\alpha,\beta$-bis(difluoramino)isobutyrate and its use as a high-energy plasticizer of polymeric binders for solid propellant systems.

---

The invention herein described was made in the course of or under a contract or subcontract thereunder, with the U.S. Air Force.

BACKGROUND OF THE INVENTION

High-energy polymers used as high-energy binders for solid propellant systems are generally viscous liquids which require a plasticizer in order to mix, cast, and cure to propellants wih acceptable physical properties. Difluoramino-containing compounds which are per se energetic have been used as plasticizers. Since difluoramino compounds tend to be highly sensitive to shock and friction, it would be advantageous to minimize this unwelcome contribution to the hazards of propellant formulation by having available a highly energetic difluoramino plasticizer having reduced shock and friction sensitivity. It would be of further advantage to obtain a plasticized high-energy binder polymeric composition, i.e., a composition of polymer containing said plasticizer, which has improved properties and improved performance in cured systems.

SUMMARY OF THE INVENTION

It has now been found that the novel 2,2-dinitropropyl $\alpha,\beta$-bis(difluoramino)isobutyrate of the formula

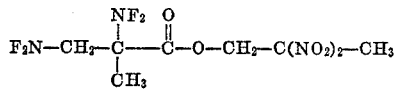

is a highly energetic nitro-difluoramino plasticizer having reduced shock and friction sensitivity.

PREFERRED EMBODIMENTS OF THE INVENTION

The novel 2,2-dinitropropyl $\alpha,\beta$-bis(difluoramino)isobutyrate of the invention is an ester produced by the reaction of tetrafluorohydrazine, $N_2F_4$, with the unsaturated ester 2,2-dinitropropyl methacrylate. The dinitropropyl methacrylate starting reactant is produced by the direct reaction between 2,2-dinitro-1-propanol and methacrylyl chloride preferably in the presence of a trace of a polymerization inhibitor and an inert solvent. This nitroalkyl methacrylate reagent preferably is purified by distillation or crystallization before commencing the difluoramination reaction with tetrafluorohydrazine.

The addition of tetrafluorohydrazine to 2,2-dinitropropyl methacrylate is essentially quantitative and can be accomplished conveniently in a batchwise or continuous manner, preferably in the presence of an inert solvent. The temperature at which the addition is conducted is from about 60° C. to about 110° C., preferably at about 75° C. The resulting 2,2-dinitropropyl $\alpha,\beta$-bis(difluoramino)isobutyrate is purified by conventional means such as fractional distillation, fractional crystallization, and the like. A preferred method of purification producing a product of high purity of advantageous properties is treating the difluoraminated ester with an adsorbent material. A solution of the difluoraminated ester in an inert solvent is passed through a body of adsorbent material, preferably maintained in subdivided form. Exemplary of suitable adsorbent materials for use in this convenient purification method are silica gels, activated carbon, cationic exchange resin such as Amberlyst 15 (Rohm and Haas Co.), molecular sieves and the like; particularly preferred are the silica gels, molecular sieves and ion exchange resins. The recovery of the purified ester of the invention from the treated solution is conveniently carried out by conventional means such as solvent stripping, fractional distillation, and the like.

Exemplary of the inert solvents suitable in the abovementioned synthetic and purification procedures are normally liquid aromatic hydrocarbons, such as benzene, toluene, and xylene; normally liquid ethers, including dialkyl ethers such as diethyl ether, dibutyl ether, and methyl hexyl ether; alkyl aryl ethers such as anisole and phenyl butyl ether; cyclic ethers such as tetrahydrofuran, dioxane, and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether, and glycerol triethyl ether; and halogenated hydrocarbons such as dichloromethane, chloroform, carbon tetrachloride, dichloroethane, tetrachloroethane, bromoform, dibromomethane, chloropropane, bromobutane, 1-chloro-2,2-difluoroethane, chloropentane, chlorobenzene, chlorocyclohexane, and the like. A particularly preferred group of solvents includes halogenated hydrocarbons of 1 to 6 carbon atoms, especially chlorohydrocarbons, and most preferred is 1,2-dichloroethane. The solvent is employed in molar excess over the amount of reactants and/or product, and in general, moles of solvent up to about 150 moles per mole of reactants and/or product are satisfactory.

2,2 - dinitropropyl $\alpha,\beta$ - bis(difluoramino)isobutyrate is utilized with advantage as a plasticizer of polymeric binders for solid propellant systems. It is especially useful when combined with poly[1,2 - bis(difluoramino) - 2,3-epoxypropane], which is a family of hydroxyl-terminated polyethers with a repeating unit of

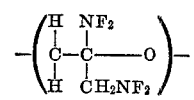

and is described in copending application of Walter L. Petty, U.S. Ser. No. 660,545, filed July 12, 1967. A particularly desirable composition is that wherein the weight ratio of 2,2-dinitropropyl $\alpha,\beta$-bis(difluoroamino)isobutyrate plasticizer to poly[1,2-bis(difluoramino) - 2,3 - epoxypropane] binder is about 1:1, i.e., about 50/50 wt. percent. Propellants formulated from 2,2-dinitropropyl $\alpha,\beta$-bis(difluoramino)isobutyrate-plasticized poly[1,2 - bis(difluoramino) - 2,3 - epoxypropane] exhibit superior properties such as high impact values, high true elongation at low temperatures, and significant reduction in burning rate, and such formulations yield propellant system which are highly stable thermally. Other commonly used difluoramino plasticizers do not contain enough oxidizing groups for complete self-combustion and must rely upon oxygen from ammonium perchlorate or other oxidizers to make up this deficiency. The 2,2-dinitropropyl $\alpha,\beta$-bis(difluoramino)isobutyrate plasticizer of the invention having a higher concentration of active oxidizing groups minimizes this deficiency when combined with poly[1,2-bis(difluoramino) - 2,3 - epoxypropane] and produces a higher performance potential when formulated into advanced propellant systems, for example, those using metal hydrides as fuel.

In the following examples all molecular weight of polymers are determined by vapor phase osmometer.

EXAMPLE 1

2,2-dinitro-1-propanol (10.0 g., 0.066 mole) was refluxed in 20 ml. of 1,2-dichloroethane with about a 100% excess of distilled methacrylyl chloride (15.0 g., 0.14 mole) in the presence of a trace of 2,6-di-tert-butyl-p-cresol antioxidant for retarding polymerization. The top of the reflux condenser was continuously purged with nitrogen to remove hydrogen chloride. Periodic infrared analysis of the reaction mixture showed the rate of hydroxyl disappearance, refluxing being continued for 5 hours until the hydroxyl absorption had almost vanished. The 1,2-dichloroethane solvent and unreacted methacrylyl chloride were stripped off at 100 mm., at a maximum heating bath temperature of 100° C. After the stripping procedure, Claisen distillation at 0.5 mm. and 85° C. gave 13.3 g. of 2,2-dinitropropyl methacrylate which, by gas-liquid chromatographic analysis, contained 5% impurities (87% yield). The 2,2-dinitropropyl methacrylate was rectified by redistillation.

*Analysis.*—Calculated for $C_7H_{10}O_6N_2$ (percent): C, 38.5; H, 4.6; N, 12.8. Found (percent): C, 37.7; H, 4.6; N, 12.4.

The nuclear magnetic resonance spectrum is consistent with the assigned structure.

EXAMPLE 2

A solution of 2,2-dinitropropyl methacrylate (8.20 g., 0.038 mole) in 200 ml. of 1,2-dichloroethane was heated to 75° C. for 5 hours under 500 p.s.i.g. of tetrafluorohydrazine in a pressure vessel. The reactor effluent was concentrated to 40 ml. and then divided into two. Each portion of the concentrated reactor effluent was purified by chromatography on a 20-in. x 1¾-in. column packed with silica gel (Grace Chem 60–200 mesh, grade 950), using 1,2-dichloroethane as eluent. Each portion was analyzed for purity by gas chromatography. A total of 10.0 g. (0.031 mole) of purified 2,2-dinitropropyl $\alpha,\beta$-bis-(difluoramino)isobutyrate was obtained.

*Analysis.*—Calculated for $C_7H_{10}O_6F_4N_4$ (percent): C, 26.1; H, 3.1; F, 23.6; N, 17.4. Found (percent): C, 26.4; H, 4.2; F, 23.5; N, 16.1.

The nuclear magnetic resonance spectrum is consistent with the assigned structure A portion of the 2,2-dinitropropyl $\alpha,\beta$-bis(difluoramino)isobutyrate was distilled at 77° C. and <0.1 mm.; gas-liquid chromatographic analysis showed no change. The index of refraction, $\eta_D^{25}$, of purified, distilled 2,2-dinitropropyl $\alpha,\beta$-bis(difluoramino) isobutyrate is 1.4317.

Whereas the impact sensitivity of many energetic plasticizers may vary from about 2 to about 15 kg.-cm. as measured by the Olin-Mathieson closed-cup impact testing method where increasing values indicated increasing stability (e.g., nitroglycerine has a value of 2), 2,2-dinitropropyl $\alpha,\beta$ - bis(difluoramino)isobutyrate gives a negative impact test result even at 100 kg.-cm.

Commonly used energetic plasticizers are friction-sensitive, i.e., they detonate even in the absence of grit in the Esso screw friction testing method. 2,2-dinitropropyl $\alpha$-$\beta$-bis(difluoramino)isobutyrate does not detonate in the presence of diamond grit in the Esso screw friction testing method, i.e., it gives a negative friction-sensitivity test result.

EXAMPLE 3

A propellant formulation of the following description was prepared:

Binder: Poly[1,2 - bis(difluoramino)-2,3-epoxypropane], mol wt. about 3700, wt. percent __ 19.86
Plasticizer: 2,2 - dinitropropyl $\alpha,\beta$ - bis(difluoramino)isobutyrate, wt. percent _____ 19.86
Oxidizer: Ammonium perchlorate, wt. percent __ 46.28
Fuel: Aluminum, wt. percent _____ 14.00
Cure:
    Binder (OH)/triol[1] (OH) equivalents ratio _____ 1.0/0.6
    OH/NCO[2] equivalents ratio _____ 1.0/1.0

[1] Added as 1,2,6-hexanetriol.
[2] Added as 3,3'-dimethyldiphenylmethane-4,4'-diisocyanate.

The measured elongation of the above propellant at low temperatures is given in the following table.

| Temperature, ° F.: | Elongation, percent |
|---|---|
| 0 | 38.8 |
| −20 | 15.9 |

The elongation at 0° F. of a similar propellant formulation utilizing a control plasticizer, 1,2,3-tris[1,2-bis(difluoramino)ethoxy]propane, in place of 2,2-dinitropropyl $\alpha,\beta$-bis(difluoramino)isobutyrate is <25%.

EXAMPLE 4

A propellant formulation of the following description was prepared.

| Ingredient: | Wt. percent |
|---|---|
| Poly[1,2 - bis(difluoramino) - 2,3 - epoxypropane], mol wt. about 3700 | 17.87 |
| 2,2 - dinitropropyl $\alpha,\beta$-bis(difluoramino)isobutyrate | 17.87 |
| 1,2,6-hexanetriol | 0.36 |
| 3,3'-dimethyldiphenylmethane - 4,4' - diisocyanate | 2.98 |
| Aluminum | 14.00 |
| Ammonium perchlorate | 46.28 |

The measured burning rate of the above propellant is 0.86 in./sec. at 1,000 p.s.i., which value is significantly lower than the burning rate of 1.20 in./sec. at 1,000 p.s.i. of a similar propellant utilizing the control plasticizer of Example 3 in place of 2,2-dinitropropyl $\alpha,\beta$-bis(difluoramino)-isobutyrate.

I claim as my invention:
1. 2,2-dinitropropyl $\alpha,\beta$-bis(difluoramino)isobutyrate.

References Cited

UNITED STATES PATENTS 3,346,621    10/1967    Petry et al. _____ 260—482 R
3,436,419    4/1969    Rhodes _____ 260—482 R X LELAND A. SEBASTIAN, Primary Examiner U.S. Cl. X.R.

149—19, 44, 88; 260—2 A